Dec. 17, 1957  I. E. WEBSTER  2,816,549
DISPENSING DEVICE
Filed Nov. 16, 1956  2 Sheets-Sheet 1
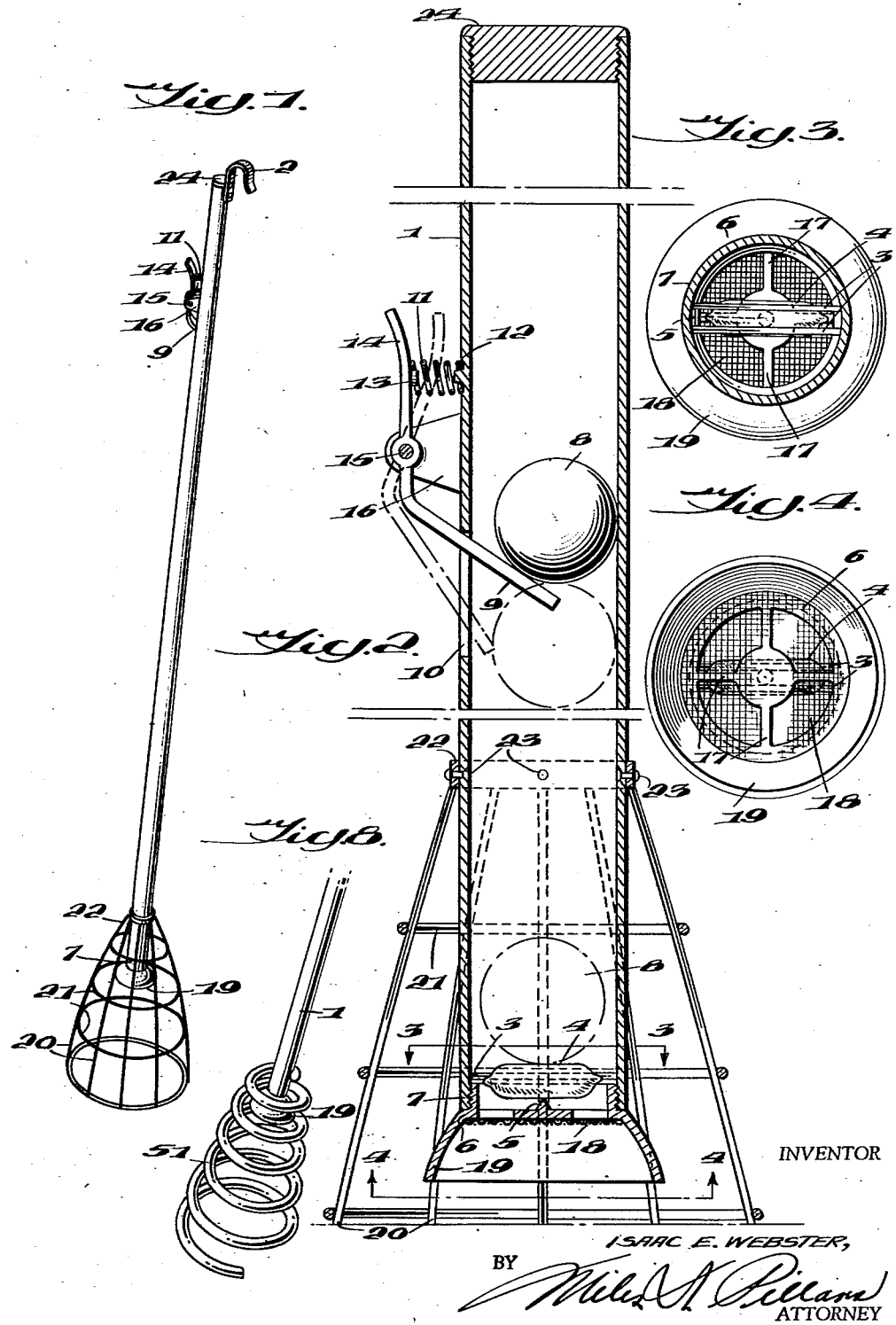
INVENTOR
ISAAC E. WEBSTER,
BY
ATTORNEY Dec. 17, 1957 I. E. WEBSTER 2,816,549
DISPENSING DEVICE
Filed Nov. 16, 1956 2 Sheets-Sheet 2
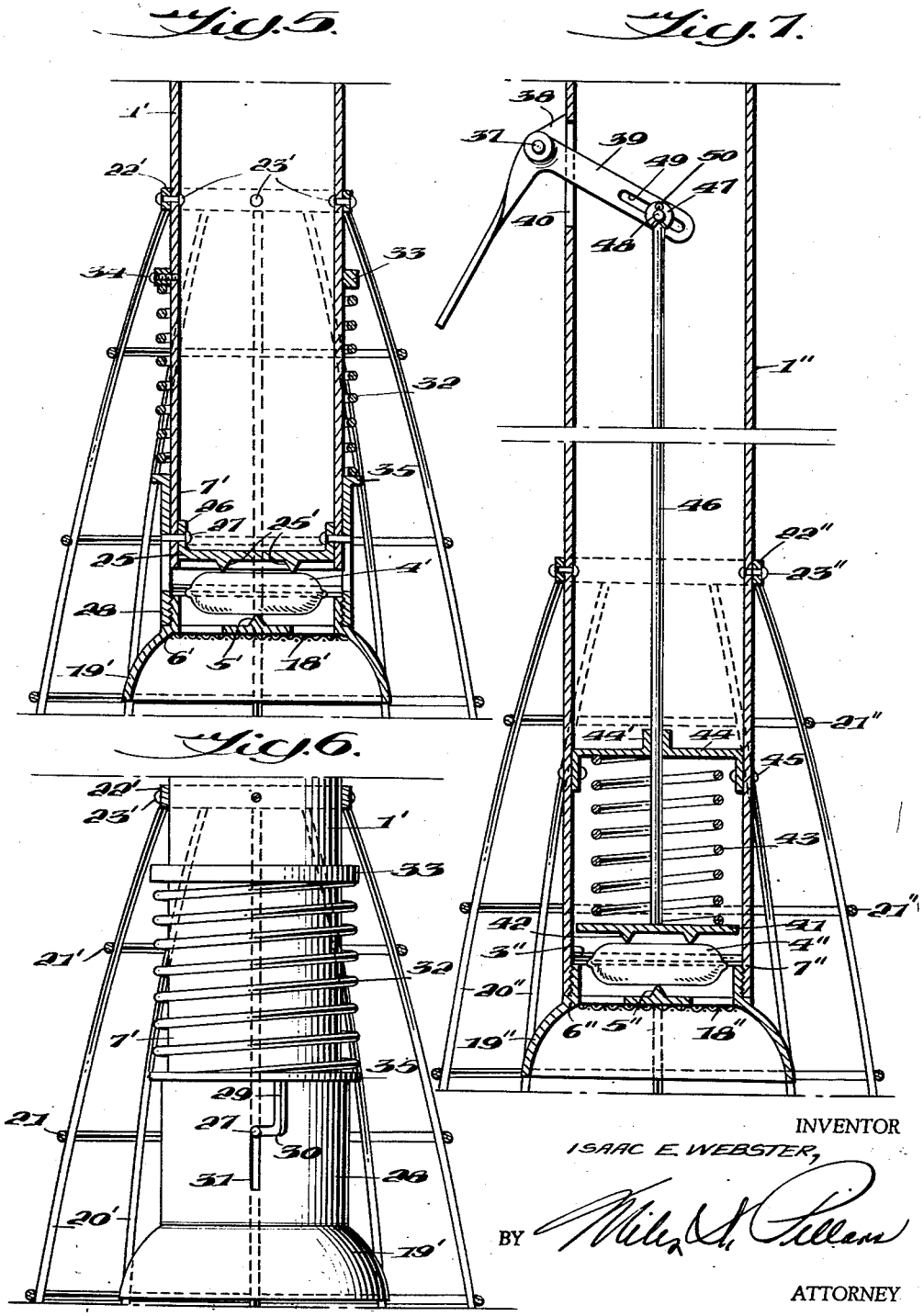
INVENTOR
ISAAC E. WEBSTER,
BY
ATTORNEY

United States Patent Office 2,816,549
Patented Dec. 17, 1957

2,816,549
DISPENSING DEVICE

Isaac E. Webster, Norristown, Pa.

Application November 16, 1956, Serial No. 622,608

15 Claims. (Cl. 128—266)

This invention relates to material dispensing devices and particularly to such devices adapted to dispense materials in a finely divided state. The invention is particularly useful in connection with devices used to dispense protective materials, such as ammonia gas, powdered pepper, and similar materials in the faces of animals, such as dogs, for deterring attacks by them upon human beings.

It is well known that certain animals, such as dogs, have a tendency to attack humans and, in certain occupations, this has almost become an occupational hazzard. Mail carriers and other deliverymen often find it very annoying, and even dangerous, to make their regular deliveries because of the habits of certain animals in attacking them without provocation. It is very desirable, therefore, that persons engaged in such occupations should have a suitable means for protecting themselves without permanently injuring such an animal.

In accordance with this invention, finely divided material, such as a noxious gas, or powdered material, such as pepper, is adapted to be dispensed adjacent to the nostrils of a dog or other animal for discouraging attack by such animal before the animal approaches dangerously near to the person. This protection is provided by arranging a readily scissionable cartridge, vial, or ampule containing the powdered material or a water or similar solution of the noxious gas in a suitable carrier sheath and providing for readily scissioning the cartridge for releasing of the powdered material or gaseous solution by simple manipulation of the device. The carrier sheath may conveniently be made in the form of a light-weight tube or a cane and is preferably provided with a carrying handle on one end and with a muzzle frame at the opposite end from the handle through which the animal-repellent material is adapted to be ejected from the carrier sheath.

An object of this invention is to provide an improved material dispensing device.

Another object of this invention is to provide an improved device for dispensing animal-repellent materials in a finely divided state at a distance from the user's hands.

Further objects and advantages of this invention will become apparent and this invention will be better understood from the following description referring to the accompanying drawings and the features of novely which characterize this invention will be pointed out with particularity in the claims annexed to and forming a part of this specification.

In the drawings:

Fig. 1 is a perspective view of one embodiment of a dispensing device made in accordance with this invention;

Fig. 2 is a longitudinal sectional view, partly broken away, of the dispensing device shown in Fig. 1;

Fig. 3 is a sectional view, taken along line 3—3 of Fig. 2, showing the relationship of cartridge retaining rod elements and a scissionable cartridge in an end of the dispensing device of Figs. 1 and 2;

Fig. 4 is a sectional view, taken along line 4—4 of Fig. 2, illustrating the material dispensing end of the device shown in Figs. 1 and 2;

Fig. 5 is a longitudinal sectional view of the material dispensing end of another embodiment of an improved dispensing device made in accordance with this invention;

Fig. 6 is a side elevational view, partly broken away, of the dispensing end of the device shown in Fig. 5, illustrating the mounting relationship of the parts of this end of the device;

Fig. 7 is a longitudinal sectional view, partly broken away, of another embodiment of an improved dispensing device made in accordance with this invention; and Fig. 8 is a perspective view, with the carrier sheath partly broken way, illustrating a modified type of muzzle.

Referring to the drawings, there is shown in Figs. 1–4 a preferred embodiment of an improved dispensing device made in accordance with this invention having a substantially tubular carrier sheath 1 provided with a suitable hande 2 mounted on one end thereof and adapted to dispense finely divided animal dispersing material from the other end of the sheath 1. The dispensing end of the sheath 1 is formed with a cartridge or ampule holder including a set of positioning rod elements 3 arranged transversely of the sheath and secured thereto a short distance from and adjacent to the outer edge of the sheath 1. A scissionable cartridge or ampule 4 formed of thin glass, plastic, or other suitable, readily scissionable or frangible material and adapted to contain the animal-dispelling material, is arranged in engagement with the positioning rod elements 3. This cartridge 4 is adapted to be held in scissionable position on the rod elements 3 by a sharp scissioning element 5, formed on the inner surface of a readily removable and replaceable screw cap 6, which threadably engages the outer end 7 of the sheath 1 adjacent to the supporting rod elements 3.

In this construction the scissionable cartridge 4 is adapted to be broken open, when desired, by the sharp impact therewith of a cartridge engaging member, such as a ball weight member 8, upon the inner surface thereof. This ball weight 8 preferably is formed of a transverse section substantially equal to that of the sheath 1, so that when it engages the inner surface of the cartridge 4, as shown in dotted lines in Fig. 2, it will substantially close the sheath 1 and minimize passage of the finely divided material from the cartridge 4 into the sheath, thereby assuring the passage of a maximum of the material out of the adjacent end of the sheath. The transverse section of the ball weight 8 is, however, made slightly less than that of the sheath 1 so as to assure its free longitudinally translatable rolling motion through the sheath. In order to provide a sufficient scissioning impact of the ball weight 8 upon the cartridge 4, it is adapted to be held in the sheath 1 away from the cartridge 4 by a manually controllable trigger mechanism and to be released thereby when desired. This trigger mechanism includes a trigger member having a finger 9 extending through an aperture 10 in the sheath 1 for holding the ball weight 8 in its cocked position, ready for use, as shown in solid lines in Fig. 2. The finger 9 is resiliently biased into holding position by any suitable means, such as a compression coil spring 11 arranged in engagement with a spring seat 12 on the sheath 1 and a complementary spring seat 13 on the underside of a second trigger finger 14. This trigger finger 14 conveniently may be formed integral with the holding finger 9 and pivotally supported by a pivot pin 15 and a pair of ears 16 on the sheath 1.

When it is desired to break open a cartridge 4, the manually controllable trigger mechanism is operated by simply depressing the trigger finger 14, as shown in dotted lines in Fig. 2, thereby swinging the finger 9 outwardly so as to allow the ball weight 8 to fall freely through the sheath 1 upon the inner surface of the cartridge 4. This sudden impact of the ball weight 8 on the cartridge 4 exerts a sudden force upon this surface of the cartridge and a similar and opposite force on the other side of the cartridge by the sharp scissioning element 5. This action is adapted to break open the cartridge 4, so as to release the finely divided material or aqueous solution of noxious gas from the cartridge 4 and cause this material to pass outwardly from the adjacent end 7 of the sheath 1.

The removable end cap 6 preferably is formed with transversely extending supporting arms 17 which extend from the sides of the cap 6 to the base of the scissioning element 5 so as to provide for the free passage of finely divided material out of the end of the carrier sheath 1. A perforate fine mesh screen member 18 is arranged over the outer side of the scissioning element 5 and over the openings between the arms 17 to form a retaining barrier over the end of the carrier sheath 1, adjacent to the cartridge holder, for preventing the escape of material from which the cartridge 4 is made, after the cartridge has been broken. This finely perforate member 18 is constructed so as to provide for the free passage therethrough of finely divided material from within the cartridge 4 so as to permit the desired ejection of this material adjacent the nostrils of an attacking animal, while preventing injury to the animal by broken glass or other material of which the cartridge might be made. The end cap 7 preferably also is made with an outwardly flared shield section 19 which directs the finely divided material along a substantially restricted path axially outwardly of the carrier sheath. In order further to assure the desired direction of the finely divided material towards the nostrils of the offending animal, a protective muzzle frame of any desired configuration, preferably is formed as a wire structure, including a plurality of outwardly extending ribs 20 connected together by a plurality of axially spaced rings 21, is mounted on the end of the sheath 1 adjacent to the cartridge holding end thereof. This muzzle frame may be mounted on the sheath in any suitable manner and may include a mounting ring 22 secured to the inner ends of the ribs 20 and suitably secured to the sheath 1 by a plurality of screws or rivets 23. The muzzle frame extends around and from the adjacent end 7 of the sheath and flares outwardly so that the snout of an offending animal may readily be covered by the muzzle, thus giving added protection to the use of this device and further assuring the desired direction of the dispersing material towards the animal's nostrils. With such a construction, an offending animal can readily be warded off without causing him injury.

After a cartridge has been broken, and its contents dispensed, it can readily be replaced by unscrewing the end cap 6, removing the scissioned cartridge material and inserting a new cartridge 4 in the position shown in Fig. 2. The end cap 6 then may be replaced so as to hold the cartridge 4 in position and the ball weight 8 returned to its cocked position, as shown in solid lines in Fig. 2.

An imperforate closure plug or cap 24 is secured over the handle end of the carrier sheath 1 in any suitable manner, as by threaded engagement therewith, so as to exclude undesirable foreign substances from the carrier sheath and provides for thoroughly cleaning the interior of the carrier sheath by removal of both end caps 6 and 24. Under normal conditions it will not be found necessary to remove the closure cap 24, or to clean the carrier sheath other than by the regular removal of the perforate end cap 6, as explained above, for replacement of the scissionable cartridge 4.

Figs. 5 and 6 disclose another embodiment of this invention in which the material dispensing device is provided with a suitable tubular carrier sheath 1', which may conveniently be made in the form of a cane or otherwise provided with a handle similar to the construction shown in Fig. 1. In this structure a suitable scissionable cartridge 4' adapted to contain an animal dispersing material, such as powdered pepper or an aqueous solution of a noxious gas, such as ammonia, is adapted to be held in position adjacent to the dispensing end of the carrier sheath 1' by a cartridge holder, including a positioning plate member 25 formed with a plurality of sharp scissioning elements 25' on the outer face thereof which are adapted to engage and position the cartridge 4' in the end of the carrier sheath. The positioning plate 25 is formed on substantially the same diameter as the inner diameter of the outer end 7' of the sheath 1' and is formed with an inwardly extending annular collar 26 which has a tight fit with the inner surface of the end 7' of the sheath, so as to prevent passage of material into the sheath 1' past the plate 25. This plate 25 may be secured in position in the end 7' of the sheath 1' in any suitable manner, as by a plurality of threaded pins 27, which extend through suitable apertures in the collar 26 and threadedly engaging corresponding threaded apertures in the end 7' of the sheath.

In this construction a scissionable cartridge 4' normally is held in position in the carrier sheath 1' in engagement with the sharp scissioning elements 25' by a readily removable screw cap 6', formed with an inwardly extending sharp scissioning element 5' adapted to engage the outer side of the cartridge 4'. The scissioning element 5' preferably is formed integral with cap 6' and is supported by a plurality of arms, similar to the arms 17 in the construction shown in Figs. 3 and 4. The cap 6' is removably secured in position by threaded engagement with the outer end of a sleeve 28 formed with an inner diameter substantially equal to the outer diameter of the end 7' of the carrier sheath and arranged over this end of the carrier sheath in freely longitudinally translatable sliding relation. The sleeve 28 is placed in operative position over the end of the carrier sheath 1' by sliding the sleeve 28 over the end 7' of the carrier sheath in a position such that a pair of bayonnet latching slots 29 pass over the outer ends of the pins 27 which are adapted to extend outwardly from the periphery of the sheath 1'. The slots 29 extend longitudinally of the sleeve 28 and terminate in transversely extending slots 30, which open into longitudinally extending guide slots 31. When the sleeve 28 has been slid over the end of the carrier sheath 1' to a position where the pins 27 reach the inner ends of the slots 29 which communicate with the transverse slots 30, the sleeve 28 is turned through an angle until the pins 27 reach the guide slots 31. A resilient compression coil spring 32 is adapted to bias the sleeve 28 outwardly, so that the ends of the pins 27 frictionally engage the outer ends of the guide slots 31 and tend to prevent accidental displacement of the sleeve. This spring 32 extends around the outer periphery of the end 7' of the carrier sheath, and is adapted to be held under compression with one end thereof seated on a collar 33 secured to the carrier sheath 1' in any suitable manner, as by a screw 34, and the other end thereof seated on an outwardly extending annular flange 35 formed on the inner edge of the sleeve 28. The sleeve 28 can be slid inwardly against the pressure of spring 32 when the guide pins 27 extend into the slots 31, and these slots 31 act as guides for assuring smooth axial sliding movement of the sleeve 28 relative to the end 7' of the carrier sheath.

The length of the slots 29 is adapted to be such that the cartridge holder scissioning elements 5' and 25 engage opposite sides of a cartridge 4' and hold it firmly in position when the pins 27 reach the inner ends of the slots 29 and enter the transverse slots 30. If a scissioning cartridge 4' of greater thickness than the distance between the adjacent ends of the sharp scissioning elements 5' and 25' be used, the cap 6' can be unscrewed from the outer end of the sleeve 28 so as to provide a space between the adjacent ends of the scissioning elements which will accommodate the thicker scissionable cartridge. With such a construction the dispersing material within the scissionable cartridge 4' is adapted to be dispensed adjacent the snout of an offending animal by placing the end cap 6' on the end of the carrier sheath 1' against the animal's snout and forcibly pressing it against the animal. This will cause the cap 6' and the sleeve 28 to slide axially of the sheath 1' towards the carrying end of the sheath, thus causing the sharp scissioning element 5' to move axially towards the scissioning elements 25', thereby breaking the cartridge 4' and forcibly ejecting its contents out of the end of the sheath 1' through the passages in the cap 6' around the scissioning element 5'.

In order to prevent injury to the animal by broken glass, of which the cartridge 4' may be made, a finely perforate screen member 18' is arranged over the end of the sheath and preferably is mounted on the cap 6', so as to prevent escape of the material forming the cartridge and yet provide for free passage therethrough of finely divided material from within the cartridge. The cap 6' preferably also is formed with a cup shaped deflecting or guiding flange 19' which is adapted to direct the finely divided material from within the sheath 1' toward the animal's nostrils.

In order further to protect the user of this dispensing device and to help concentrate the fumes or powdered material, the carrier sheath preferably is provided with a protective muzzle frame extending around and from the cartridge holding end 7' of the carrier sheath. This protective muzzle conveniently may be formed of outwardly flared wire rib elements 20' secured to the sheath 1' in any suitable manner, as by a mounting ring 22' fastened to the carrier sheath by a plurality of suitable screws or rivets 23'. The ribs 20' are held in desired spaced relationship by a plurality of axially spaced wire rings 21, which may be fastened to the ribs 20' in any suitable manner, as by soldering, welding, or the like. Replacement of the scissionable cartridge can readily be done by simply unscrewing the cap 6', removing the broken material of a scissioned cartridge from the end of the carrier sheath 1' and the inside of the cap 6', inserting a new cartridge 4' in position on the scissioning element 25, and replacing the cap 6'.

Fig. 7 illustrates a further embodiment of an improved material dispensing device incorporating the present invention and includes a tubular carrier sheath 1" which may be made in the form of a cane, or provided with a handle similar to that shown in Fig. 1. This dispensing device is adapted to hold a readily replaceable scissionable cartridge or capsule 4" containing animal dispersing material, such as a water solution of ammonia or powdered pepper, for ejection towards the nostrils of an offending animal. The scissionable cartridge 4" is adapted to be mounted in the end of the carrier sheath 1" away from the handle end thereof and to be positioned in scissionable relation by a cartridge holder comprising a pair of positioning rods 3", extending transversely across the end 7" of the sheath 1", a slight distance from the outer edge thereof, in the same manner as the structure disclosed in Figs. 2–4. A readily removable cap 6" threadedly engages the end 7" of the carrier sheath and is formed with a sharp scissioning element 5" extending inwardly on the inner surface thereof and secured to the rim of the cap 6" by suitable web arms, such as the arms 17 shown in Fig. 3.

In this construction the dispensing of the material within the cartridge 4" is adapted to be manually controlled by a trigger mechanism, including a trigger 36 pivotally mounted by a pivot pin 37 extending through ears 38 on the carrier sheath 1" adjacent to the handle end thereof. The trigger 36 may conveniently be made in the form of a bell crank having an arm 39 extending through a slot 40 in the sheath 1" and into the interior of the sheath. The trigger mechanism is operatively connected to a cartridge engaging scissioning member which includes a plunger 41 made on a diameter substantially equal to the inner diameter of the sheath 1" and arranged in a freely longitudinally translatable relation within the sheath 1" adjacent to the cartridge positioning rod elements 3". This plunger 41 preferably is provided with a plurality of sharp scissioning elements 42 on the outer surface thereof adjacent to the positioning rods 3" and adapted to engage the inner surface of the cartridge 4" when the trigger 36 is not in its cocked position. The actuating force for the plunger 41 is adapted to be provided by a resilient compression coil spring 43 arranged within the carrier sheath 1". This spring 43 is held in compression between the inner surface of the plunger 41 and a suitable spring seat member 44 which extends transversely of the sheath 1" and is fixedly secured therein in any suitable manner, as by a plurality of rivets, or screws, 45. In this manner, the compressed spring 43 biases the plunger 41 outwardly of the carrier sheath 1" towards the cartridge scissioning element 5".

Operation of the scissioning plunger member 41 is controlled by operatively connecting it to the trigger 36 by a connecting rod 46. This rod 46 is secured to the inner surface of the plunger 41, extending inwardly therefrom towards the handle end of the sheath 1", and is adapted to be guided in its movement longitudinally through the sheath 1" by a guide bearing 44', formed as a hub substantially centrally of the spring seat member 44. The end of the rod 46 away from the plunger 41 preferably is formed as a clevice 47 which embraces the end of the trigger bell crank arm 39 and is pivotally and slidably secured thereto by a suitable pivot pin 48, extending through coaxial openings in the clevice 47 and a longitudinally extending guide slot 49 in the end of the trigger bell crank arm 39. The pivot pin 48 can be secured in position in any suitable manner, as by a cotter pin 50. This mechanism provides for a quick positive scissioning of a cartridge 4" by simply manually depressing and releasing the trigger 36. Depression of the trigger 36 cocks the cartridge scissioning mechanism by drawing the clevice end 47 of the connecting rod 46 toward the handle end of the sheath 1" and correspondingly drawing the plunger 41 against the compression spring 43 and toward the spring seat 44. Then, when it is desired to dispense material from within a cartridge 4", the trigger 36 is merely released from its cocked position, and the compression spring 43 biases the plunger 41 away from the spring seat 44 and toward the scissioning element 5" on the cap 6". This causes the sharp scissioning elements 42 on the plunger 41 to engage the inner surface of a cartridge 4" with a sudden force sufficient to scission the cartridge and to exert thereon a force tending to eject dispersing material from the cartridge outwardly of the end of the carrier sheath through apertures in the cap 6" around the scissioning element 5".

The cartridge 4" may be made of any suitable scissionable material, such as plastic or frangible glass, and, if it be made of material which might permanently injure an animal, it is desirable that such material should not be ejected from the carrier sheath with the dispersing material. It is preferable therefore that a finely perforate screen member 18" be arranged over the dispensing end of the carrier sheath 1" and preferably mounted on the removable cap 6", so that it can be readily cleaned of the material of a scissioned cartridge 4", after such a cartridge has been broken and before it is replaced with a new cartridge.

As in the other embodiments of this invention, the dispensing device preferably is provided with a cup shaped material-directing outwardly flared shield 19" conveniently formed on the outer edge of the cap 6". Also, as in the other structures embodying this invention, it is preferred that a protective muzzle frame be arranged around the dispensing end of the carrier sheath 1" for more effectively directing the material towards the nostrils of an offending animal by placing this muzzle over the animal's snout. In order more effectively to place the muzzle frame over the animal's snout, the frame may be conveniently constructed, as in the other embodiments of this invention, of suitable longitudinally extending outwardly flared wire ribs 20" connected together at spaced intervals by a plurality of wire rings 21". This muzzle is mounted on the dispensing end of the carrier sheath 1" by a suitable ring or band 22" secured to the ends of the ribs 20" and to the carrier sheath 1" by a plurality of rivets or screws 23". This construction has advantage over the construction shown in Figs. 5 and 6 of not requiring positive engagement of the dispensing end of the device with an offending animal and, in addition, provides for the scissioning engagement of a cartridge by a positively biased scissioning plunger which, in some instances, may be more effective than a gravity biased carriage engaging member, such as a ball weight 8 of the structure shown in Fig. 2. Replacement of a scissioned cartridge 4", in this embodiment of the invention, is the same as that in Fig. 2, so that the dispensing device may be repeatedly and readily used by simple replacement of the cartridge after each operation of the device.

Fig. 8 illusrates a modified form of the muzzle which is mounted on the end of a carrier sheath embodying any of the forms of this invention disclosed in Figs. 1–7 and which may be found to be more practical in some instances where a more rugged muzzle is desired. In this construction the muzzle comprises a simple spiral coil 51 of any suitable material, such as a spring steel rod or aluminum tube, which is secured to the end of the carrier sheath 1. The small end of the coil 51 may be secured to the carrier sheath 1 in any suitable manner as by soldering, welding, or riveting, these parts together. With such a construction, the finely divided dispersing material may be more effectively concentrated near the nostrils of an offending animal as, if this material is in a liquid form, it will tend to travel outwardly along the convolutions of the coil.

While particular embodiments of this invention have been illustrated and described, modifications thereof will occur to those skilled in the art. It is to be understood, therefore, that this invention is not to be limited to the particular arrangements disclosed, and it is intended in the appended claims to cover all modifications which do not depart from the spirit and scope of this invention.

I claim:

1. A device for dispensing materials in a finely divided state comprising a carrier sheath, a sharp cartridge scissioning element arranged within said sheath adjacent to an end thereof, a scissionable cartridge containing material to be dispensed and arranged within said sheath, and means including a cartridge engaging member freely longitudinally translatable of said sheath for scissioning said cartridge by exerting pressure thereon against said sharp scissioning element whereby the material contained in said cartridge is released and dispensed from said sheath through the adjacent end thereof.

2. A device for dispensing materials in a finely divided state comprising a carrier sheath, a scissionable cartridge containing material to be dispensed replaceably arranged in said sheath, means for scissioning said cartridge adjacent an end of said sheath, and a muzzle extending around and from said cartridge scissioning end of said sheath.

3. A device for dispensing materials in a finely divided state comprising a carrier sheath, a cartridge scissioning element arranged within said sheath adjacent to an end thereof, a scissionable cartridge containing material to be dispensed and arranged in engagement with said scissioning element, means including a cartridge engaging member longitudinally translatable of said sheath for exerting pressure on said cartridge against said scissioning element for scissioning said cartridge whereby material therein is released, and a readily replaceable end member over said end of said sheath for removing and replacing a scissioned cartridge with an unused cartridge.

4. A device for dispensing materials in a finely divided state comprising a carrier sheath, a scissionable cartridge containing material to be dispensed arranged in said sheath, means over the outer end of said sheath for preventing escape of the material forming said cartridge and providing for free passage therethrough of finely divided material from within said cartridge, a manually controllable means for scissioning engagement with said cartridge, and a protective muzzle extending around and from the material dispensing end of said sheath.

5. A device for dispensing materials in a finely divided state comprising a tubular carrier sheath having a carrying handle, a cartridge holder within said sheath with a scissioning element adjacent to an end thereof, a scissionable cartridge containing material to be dispensed and arranged in engagement with said cartridge holder, readily replaceable means over the outer end of said sheath adjacent to said cartridge holder for preventing escape of the material forming said cartridge and providing for free passage therethrough of finely divided material from within said cartridge and for removing and replacing a scissioned cartridge with an unused cartridge, means including a cartridge engaging member arranged longitudinally translatable of said sheath, resilient means for biasing said cartridge engaging member longitudinally of said sheath away from said handle, and a protective muzzle frame extending around and from said cartridge holding end of said sheath.

6. A device for dispensing materials in a finely divided state comprising a carrier sheath, a cartridge scissioning element arranged within said sheath adjacent to an end thereof, a scissionable cartridge containing material to be dispensed and arranged in engagement with said scissioning element, means including a cartridge engaging member longitudinally translatable within said sheath for exerting pressure on said cartridge against said scissioning element, and a manually controllable trigger mechanism for holding said cartridge engaging member away from said cartridge and for releasing said cartridge engaging member for scissioning engagement with said cartridge.

7. A device for dispensing materials in a finely divided state comprising a carrier sheath, a cartridge holder including a set of supporting rod elements extending transversely of said sheath adjacent to an end thereof, a scissionable cartridge containing material to be dispensed arranged in engagement with said cartridge holder, means including a perforate member over the outer end of said sheath adjacent to said cartridge holder for preventing escape of the material forming said cartridge and providing for free passage therethrough of finely divided material from within said cartridge, and manually controllable means on said sheath for scissioning said cartridge whereby material therein is released and dispensed from said sheath through said perforate member.

8. A device for dispensing materials in a finely divided state comprising a carrier sheath, a sharp cartridge scissioning element arranged within said sheath adjacent to an end thereof, a scissionable cartridge containing material to be dispensed and arranged within said sheath, means including a cartridge engaging member freely longitudinally translatable within said sheath for scissioning said cartridge by exerting pressure thereon against said sharp scissioning element whereby the material contained therein is released and dispensed from said sheath through the adjacent end thereof, and a trigger mechanism including a resiliently biased member for holding said cartridge engaging member away from said cartridge and for releasing said cartridge engaging member for scissioning engagement with said cartridge.

9. A device for dispensing materials in a finely divided state comprising a carrier sheath, a cartridge holder including a set of positioning rod elements extending transversely of said sheath adjacent to an end thereof, a scissionable cartridge containing material to be dispensed arranged in engagement with said cartridge holder, means including a fine perforate screen member over the outer end of said sheath adjacent to said cartridge holder for preventing escape of the material forming said cartridge and providing for free passage therethrough of finely divided material from within said cartridge, manually controllable means on said sheath for scissioning said cartridge and releasing material therefrom in a finely divided state to be dispensed from said sheath through said perforate screen member, and a protective muzzle frame extending around and from said cartridge holding end of said sheath.

10. A device for dispensing materials in a finely divided state comprising a carrier sheath, a cartridge holder including a set of positioning rod elements extending transversely of said sheath adjacent to an end thereof, a scissionable cartridge containing material to be dispensed arranged in engagement with said cartridge holder, means including a removable perforate member over the outer end of said sheath adjacent to said cartridge holder for replacing cartridges in said sheath and for preventing escape of the material forming said cartridge and providing for free passage therethorugh of finely divided material from within said cartridge, manually controllable means on said sheath for scissioning said cartridge whereby material therein is released and dispensed from said sheath through said perforate member, and a protective muzzle frame extending around and from said cartridge holding end of said sheath.

11. A device for dispensing materials in a finely divided state comprising a carrier sheath, a cartridge holder including a set of positioning rod elements extending transversely of said sheath adjacent to an end thereof, a scissionable cartridge containing material to be dispensed arranged in engagement with said cartridge holder, means over the outer end of said sheath adjacent to said cartridge holder for preventing escape of the material forming said cartridge and providing for free passage therethrough of material from within said cartridge, manually controllable means on said sheath for scissioning said cartridge whereby material therein is released and dispensed from the adjacent end of said sheath, and a protective muzzle frame extending around and from said cartridge holding end of said sheath.

12. A device for dispensing materials in a finely divided state comprising a carrier sheath, a cartridge holder and positioning member having a sharp cartridge scissioning element arranged within said sheath adjacent to an end thereof, a scissionable cartridge containing material to be dispensed arranged in engagement with said cartridge holder in engagement with said scissioning element, means including a cartridge engaging member having a transverse section substantially equal to that of said sheath and being freely longitudinally translatable within said sheath for scissioning said cartridge by exerting pressure thereon against said sharp scissioning element and thereby releasing material therefrom in a finely divided state and dispensing the same from said sheath through the adjacent end thereof, and a manually controllable trigger mechanism including a pivotally mounted resiliently biased member for holding said cartridge engaging member away from said cartridge and for releasing said cartridge engaging member for scissioning engagement with said cartridge.

13. A device for dispensing materials in a finely divided state comprising a carrier sheath having a handle, a sharp cartridge scissioning element arranged within said sheath adjacent to an end thereof, a scissionable cartridge containing material to be dispensed and arranged in engagement with said scissioning element, means including a cartridge engaging member having a transverse section substantially equal to that of said sheath and being freely longitudinally translatable within said sheath for scissioning said cartridge by exerting pressure thereon against said sharp scissioning element and thereby releasing material therefrom in a finely divided state and dispensing the same from said sheath through the adjacent end thereof, and a manually controllable trigger mechanism including a pivotally mounted resiliently biased member for holding said cartridge engaging member away from said cartridge and for releasing said cartridge engaging member for scissioning engagement with said cartridge.

14. A device for dispensing materials in a finely divided state comprising a tubular carrier sheath, a cartridge holder within said sheath adjacent to an end thereof, a scissionable cartridge containing material to be dispensed and arranged in engagement with said cartridge holder, means over the outer end of said sheath adjacent to said cartridge holder for preventing escape of the material forming said cartridge and providing for free passage therethrough of finely divided material from within said cartridge, means including a cartridge engaging member comprising a plunger having sharp scissioning elements on the outer surface thereof and being arranged longitudinally translatable within said sheath, resilient means for biasing said plunger towards said cartridge holder, a manually controllable trigger mechanism for biasing said plunger away from said cartridge holder against said resilient means and releasing said plunger for scissioning engagement with said cartridge, and a protective muzzle frame extending around and from said cartridge holding end of said sheath.

15. A device for dispensing materials in a finely divided state comprising a tubular carrier sheath, a cartridge holder within said sheath adjacent to an end thereof, a scissionable cartridge containing material to be dispensed arranged in engagement with said cartridge holder, means over the outer end of said sheath adjacent to said cartridge holder for preventing escape of the material forming said cartridge and providing for free passage therethrough of finely divided material from within said cartridge, means including a cartridge engaging ball weight member freely longitudinally translatable within said sheath for scissioning said cartridge and releasing material therefrom in a finely divided state and dispensing the same from said sheath through the adjacent end thereof, a manually controllable trigger mechanism including a pivotally mounted resiliently biased member for holding said cartridge engaging member away from said cartridge and for releasing said cartridge engaging ball weight member for scissioning engagement with said cartridge, and a protective muzzle frame extending around and from said cartridge holding end of said sheath.

No references cited.